United States Patent
Malinowski et al.

(10) Patent No.: US 10,816,386 B2
(45) Date of Patent: Oct. 27, 2020

(54) SYSTEM AND METHOD FOR CORRECTING METER SIZING

(71) Applicants: Badger Meter, Inc., Milwaukee, WI (US); Marquette University, Milwaukee, WI (US)

(72) Inventors: Michele Malinowski, Hartford, WI (US); Richard Povinelli, Milwaukee, WI (US)

(73) Assignee: Badger Meter, Inc., Milwaukee, WI (US)

( * ) Notice: Subject to any disclaimer, the term of this patent is extended or adjusted under 35 U.S.C. 154(b) by 321 days.

(21) Appl. No.: 15/910,453

(22) Filed: Mar. 2, 2018

(65) Prior Publication Data

US 2019/0271583 A1    Sep. 5, 2019

(51) Int. Cl.
  *G01F 25/00*  (2006.01)
  *G01F 15/06*  (2006.01)
  *G01F 1/78*   (2006.01)

(52) U.S. Cl.
  CPC ............ *G01F 25/0007* (2013.01); *G01F 1/78* (2013.01); *G01F 15/063* (2013.01)

(58) Field of Classification Search
  None
  See application file for complete search history.

(56) References Cited

U.S. PATENT DOCUMENTS

| | | | |
|---|---|---|---|
| 6,606,570 B2 | 8/2003 | Bugarin et al. | |
| 7,146,288 B1 * | 12/2006 | Welch ................ | H04N 21/4344 702/179 |
| 7,197,408 B2 | 3/2007 | Ferreira et al. | |
| 7,516,023 B2 | 4/2009 | Ferreira et al. | |
| 8,269,650 B2 | 9/2012 | Cornwall et al. | |
| 2005/0060107 A1 * | 3/2005 | Rodenberg, III ...... | G01D 4/006 702/62 |
| 2006/0141940 A1 * | 6/2006 | Bloom .................. | G01D 4/002 455/73 |
| 2006/0007016 A1 | 12/2006 | Borkowski et al. | |
| 2008/0001778 A1 | 1/2008 | Challener et al. | |
| 2008/0316050 A1 * | 12/2008 | Showcatally .......... | G01D 11/24 340/870.02 |
| 2009/0146839 A1 | 6/2009 | Reddy et al. | |
| 2010/0076615 A1 | 3/2010 | Daniel et al. | |

(Continued)

OTHER PUBLICATIONS

International Search Report and Written Opinion from corresponding PCT application PCT/US2019/019938 dated Jun. 14, 2019 (11 pages).

*Primary Examiner* — Gregory J Toatley, Jr.
*Assistant Examiner* — Brandon J Becker
(74) *Attorney, Agent, or Firm* — Boyle Fredrickson, S.C.

(57) ABSTRACT

A computer implemented method for selecting an appropriately sized meter for use in a selected application implemented by a computer processor implementing instructions stored in a non-transient memory is described. The instructions include receiving utility meter data transmitted from a plurality of utility meters, each utility meter being installed at a unique utility monitoring location, identifying incorrectly sized utility meters based on utility meter data for particular utility meters that displays quantization effects, and selecting an appropriate meter based on the identification of the utility meters displaying quantization effects.

17 Claims, 7 Drawing Sheets

(56) References Cited

U.S. PATENT DOCUMENTS

| | | | |
|---|---|---|---|
| 2011/0178733 A1* | 7/2011 | Seehoffer | G01F 15/066 702/45 |
| 2015/0003665 A1* | 1/2015 | Kumar | G06K 9/325 382/100 |
| 2016/0125355 A1* | 5/2016 | Nazzari | G06Q 10/087 235/385 |
| 2018/0374037 A1* | 12/2018 | Nazzari | G06Q 10/087 |

* cited by examiner

SYSTEM AND METHOD FOR CORRECTING METER SIZING

FIELD OF THE INVENTION

This application relates to monitoring utility metering equipment to identify and replace utility meter equipment based on data received from the utility meter equipment. More specifically, this application relates to a system and method for replacing utility metering equipment that generates data having a particular data profile.

BACKGROUND

Utility metering systems typically involve utility meters equipped with radio transmitters operating in a local area network with radio receivers, often mounted on a rooftop or a utility pole. The receivers also sometimes operate as gateways, for collecting meter data from the transmitters and then transmitting the meter data through a second network to a central office. The meter data is transmitted from the receivers or gateways to the central office for processing into customer statements of account. Systems including this type of technology are referred to as Automated Meter Reading (AMR) systems. Typically, there is at least a network communications computer and an applications computer at the central office of the local utility, although various systems at the collection end are possible and are known in the art.

Utility meters are typically installed in residential, industrial and commercial properties to measure and report the consumption of the utility being provided at the property. Utility meters are typically chosen for specific properties based on an anticipated utility usage for the property. However, it occasionally occurs that the anticipated utility usage differs from the actual utility usage such that the utility meter is incorrectly sized for the property. If the meter is too large, the low-flow of daily usage will not be measured with sufficient granularity. If the meter is too small, the-flow may exceed the design parameters and prematurely wear out one or more components of the meter, such as the disc in a disc type flow meter.

Once installed, it is typically difficult for a utility company to audit meters for appropriate sizing. A manual audit to investigate meter sizing is labor-intensive and requires knowledge of every location (household/business size/consumption rates, etc.). Further, auditing a meter may require the use of particular hardware and/or reading equipment to make the measurement. Yet further, utility meters may be installed in inaccessible locations, such as basements, such that conducting an audit would require coordinating a meter review appointment with the owner of each individual property.

Utility meters are periodically scheduled for replacement based on anticipated life of components, power sources, etc. During replacement, utilities typically order the same sized meters as indicated on the records, and may replace meters with the same (incorrect) size, due to a lack of inventory of correctly sized meters. Schedule replacement may require changes to pipe diameter and other effort, requiring a separate scheduled work order.

What is needed is a system and method for identifying individual meters having measurements indicating incorrect sizing, resolution, or other unexpected consumption information. A list of meters that are produced can then be used by the utility to target their efforts, reducing the amount of labor and capital needed to audit their entire customer base.

SUMMARY OF THE INVENTION

This invention may be used to identify incorrectly sized meters based on detected quantization effect patterns in utility meter data transmitted from utility meters. Specifically, the detection of quantization effect patterns has been determined to be associated with meters that are oversized for a particular installation.

In one more detailed aspect, a computer implemented method for selecting an appropriately sized meter for use in a selected application implemented by a computer processor implementing instructions stored in a non-transient memory is described. The instructions include receiving utility meter data transmitted from a plurality of utility meters, each utility meter being installed at a unique utility monitoring location, identifying incorrectly sized utility meters based on utility meter data for particular utility meters that displays quantization effects, and selecting an appropriate meter based on the identification of the utility meters displaying quantization effects.

In another more detailed aspect, a meter replacement system for selecting an appropriately sized meter for use in a selected application is shown. The system includes a database including utility meter data transmitted from a plurality of utility meters, each utility meter being installed at a unique utility monitoring location, a meter sizing analysis system including a computer processor implementing instructions from a sizing application stored in non-transient memory for identifying incorrectly sized utility meters based on utility meter data for particular utility meters that displays quantization effects, and a meter replacement system for ordering a replacement meter having a correct sizing based on the identification of the utility meters displaying quantization effects. The system may further be configured such that the quantization effect in the utility meter data is generated by a utility meter that accumulates flow information over a period of time longer than a measurement period for that meter without incrementing a flow unit.

In another more detailed aspect, a self-correcting advanced metering infrastructure including a plurality of utility meters, a meter communication system and a utility meter management system is shown. The infrastructure includes a plurality of utility meters, each utility meter configured to measure and transmit utility consumption data at a unique utility monitoring location, a meter communication network for communication the utility consumption data from the plurality of utility meters to the utility meter management system, a meter sizing management system including a computer processor implementing instructions stored in non-transient memory for identifying incorrectly sized utility meters based on the transmitted utility consumption data for the plurality of utility meters that display quantization effects, and a meter replacement system for ordering a replacement meter having a correct sizing based on the identification of the utility meters displaying quantization effects to improve utility monitoring accuracy.

Other aspects of the invention, besides those discussed above, will be apparent to those of ordinary skill in the art from the description of the preferred embodiments which follows. In the description, reference is made to the accom-

DETAILED DESCRIPTION OF THE INVENTION

Figure 1:
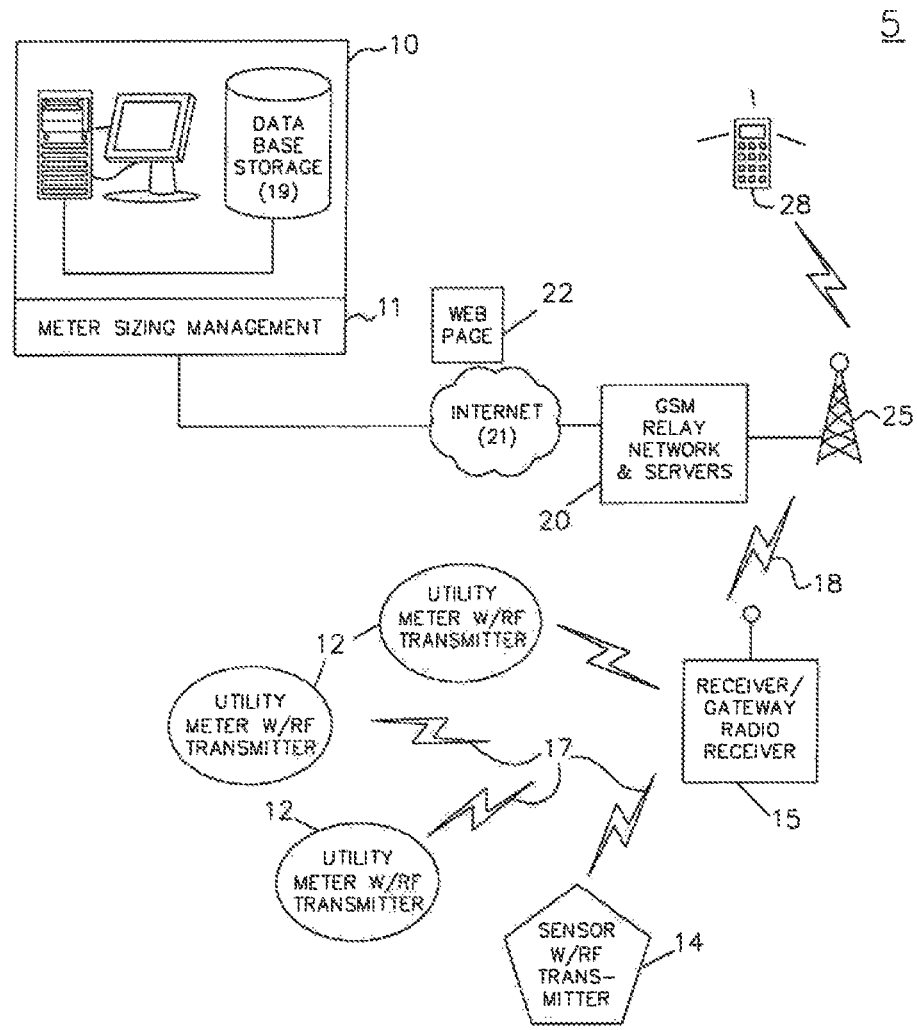
FIG. 1 is a schematic of a fixed-network AMR system for collecting meter data from transmissions from meter data reading devices, according to an exemplary embodiment.
Figure 2A:
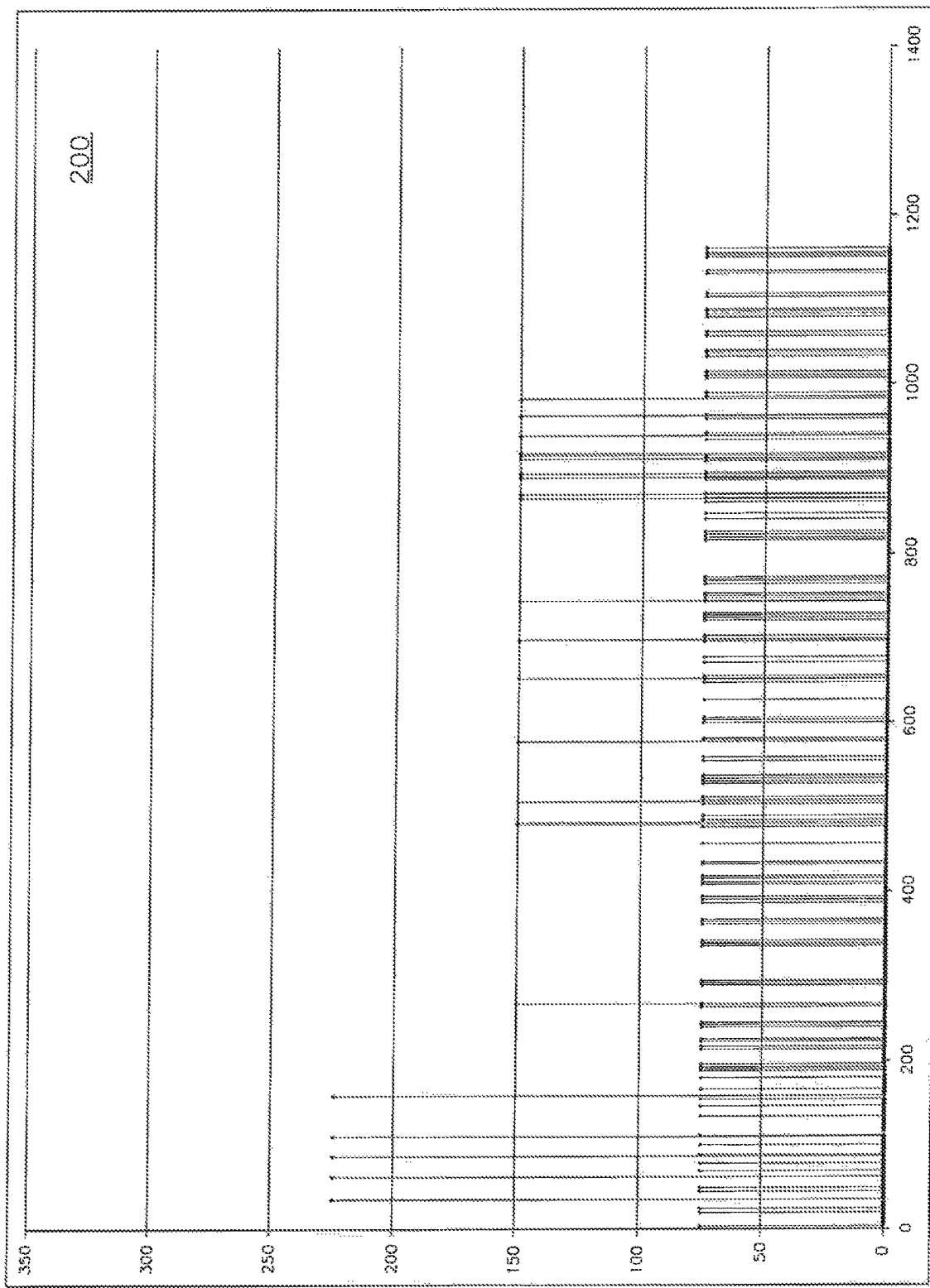
FIGS. 2A-D are graphs depicting consumption data over time for six representative utility meter locations, according to an exemplary embodiment.
Figure 2B:
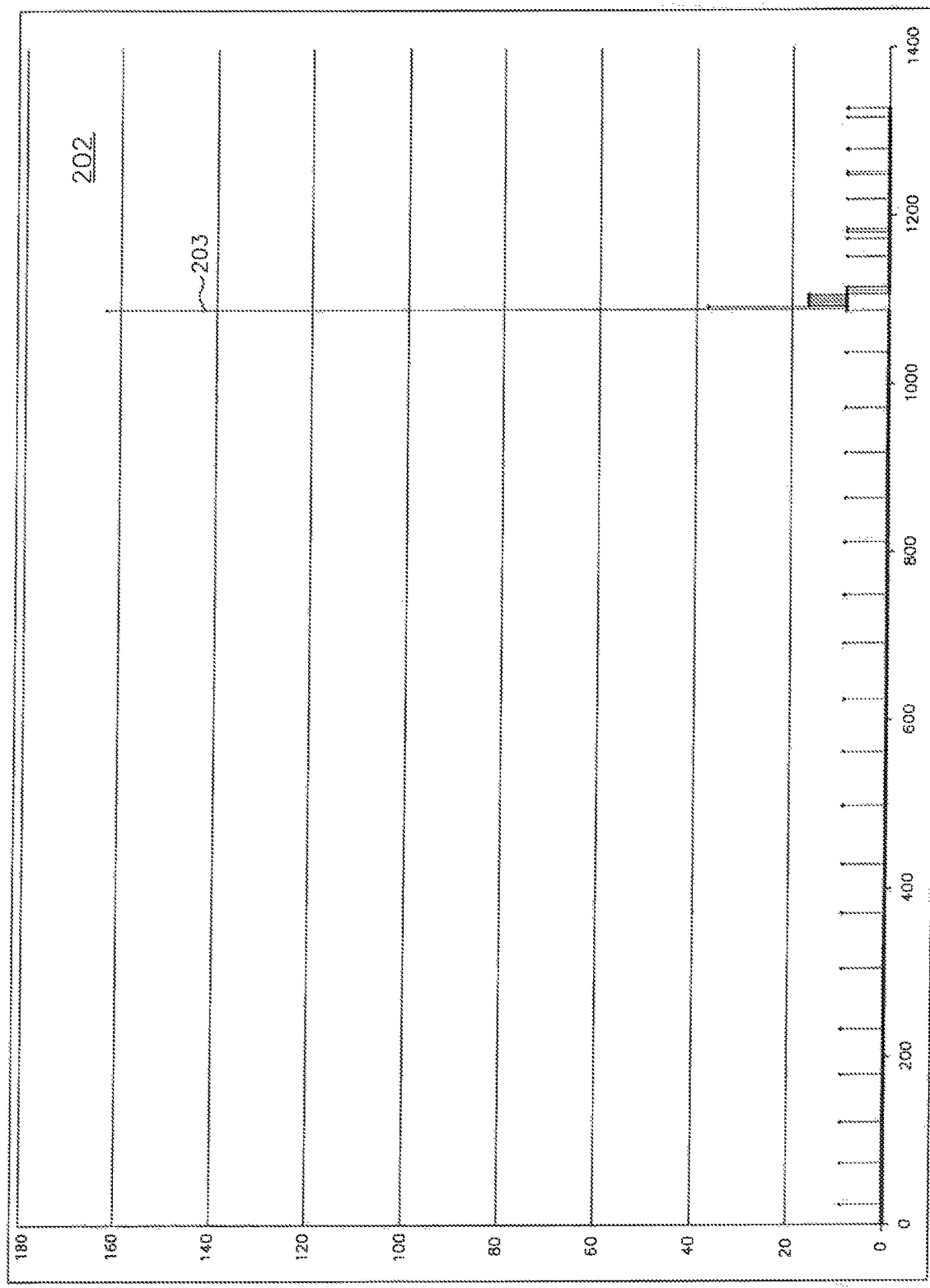
Figure 2C:
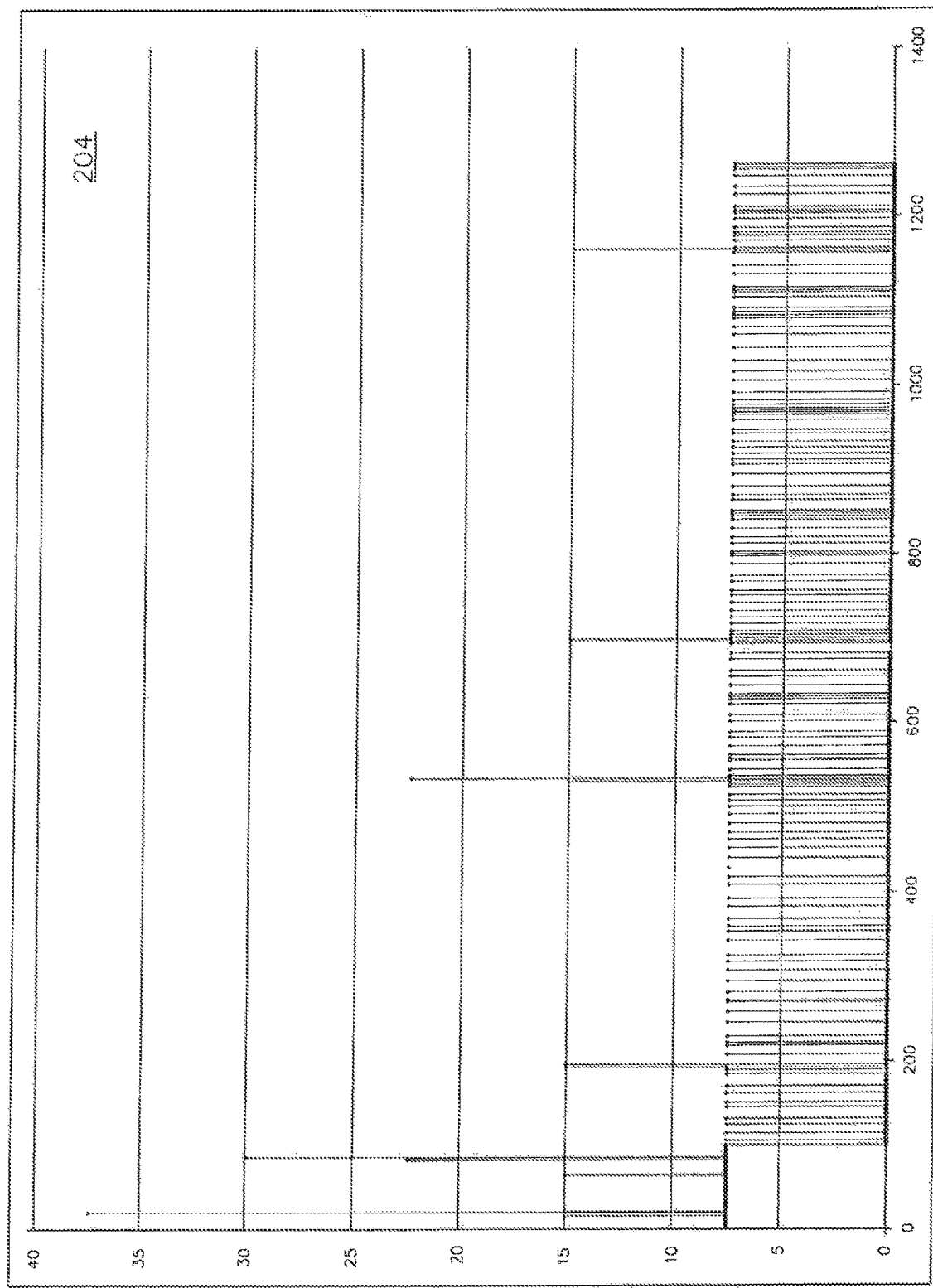
Figure 2D:
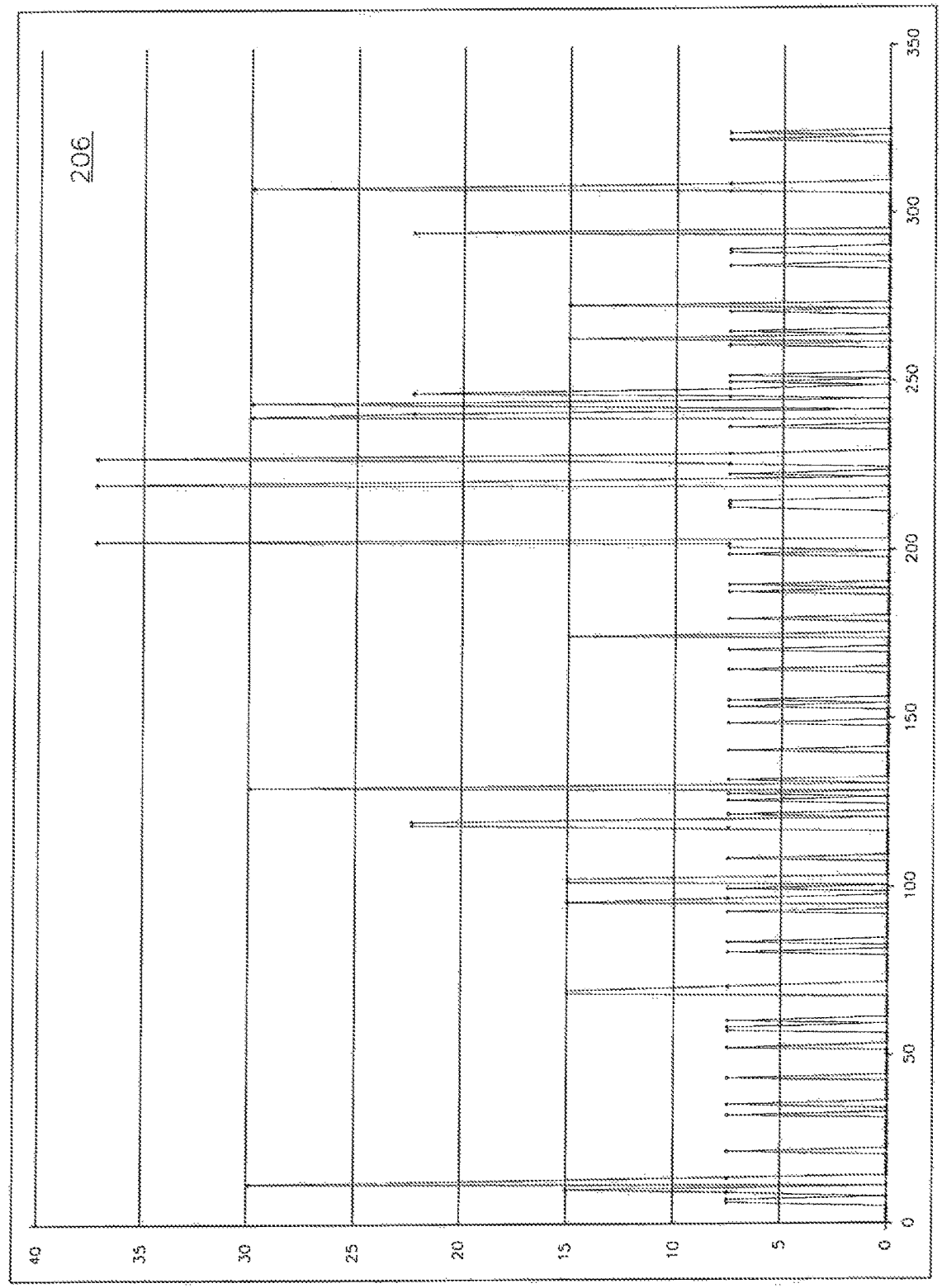

Referring to FIG. 1, a utility metering system 5 for monitoring, communicating, and utilizing utility usage information is shown, according to an exemplary embodiment. Although shown with a particular number, type and configuration of devices, it should be understood that a wide variety of systems may be implemented for use with the functionality described herein.

A network gateway receiver 15 is installed on a roof top (not shown) or on a utility pole (also not shown). In this preferred embodiment, the utility is water, however, in other embodiments the utility may be gas or electricity.

A plurality of meter reading devices 12 each of which includes a utility meter, a transducer and an RF (radio frequency) transmitter is shown. In this example, the units 12 can be meter reading and transmitting units commercially offered under the Orion® trademark or the Galaxy® trademark by the assignee of the present invention. These meter reading devices 12 transmit radio frequency (RF) signals 17 to the receiver 15 to form a local area wireless network. It should be understood that there is typically more than one receiver 15 in a network, although only one is illustrated in FIG. 1. Sometimes the receiver 15 is also referred to as a "gateway" because it interfaces between the local area wireless network and another longer range network 21. Alternatively, the meter reading devices 14 may be sensors for sensing other types of conditions at the utility meter or in supply links connected to the utility meters. These sensors may be connected to Orion® or Galaxy® radio transmitters to transmit status data to the receiver 15.

The meter reading devices 12, 14 read meter data and certain alarm/condition status data from the meters. As used herein, the term "meter data" should be understood to include either utility consumption data or condition status data, or both. Condition status data includes leak detection data, tamper data and shut-off valve data and other types of data concerning meter operation besides actual utility consumption data.

The devices 12, 14 transmit data-encoded RF signals over low power RF frequencies either in the non FCC-licensed ISM (Industrial-Scientific-Medical) band from 902 MHz to 928 MHz or in the FCC-licensed frequencies such as 150-200 Mhz, 325 MHz, 433.92 MHz or from 450 to 470 MHz. The meter data transmitters 12, 14 transmit to an RF receiver 15, which in this case is a Galaxy® receiver offered by the assignee of the present invention. The receiver 15 is provided with wireless capability to re-broadcast transmissions to a GSM cellular tower 25, a GSM network 20 and the Internet 21 to a utility management system 10 including a database stored in a database storage unit 19. The database stores a receiver network address, a list of transmitting devices 12, 14 served by the receiver 15, a history of readings for the transmitting devices 12, 14 and a history of readings from the receiver 15. It should be mentioned here that many architectures are available for utility management systems using additional servers and other components and these are within the scope of the present invention.

According to an exemplary embodiment, utility management system 10 may be implemented as a method, system, or on a computer readable medium. Accordingly, the present approach may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present approach may take the form of a computer program product on a computer readable medium having computer-usable program code embodied in the medium.

The present approach is described below with reference to flowchart illustrations and/or block diagrams of methods, apparatus (systems) and computer program products according to embodiments of the approach. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Utility management computer system 10 may be configured to store in non-transient memory and execute by computer instructions for implementing functionality for an advanced metering infrastructure (AMI), for example including meters, radios, analytic software, etc., for gathering a disseminating information to and from a plurality of utility meters including a meter sizing management module 11. Meter sizing management module 11 may be implemented in hardware or software to improve the overall AMI system to measure and evaluate meter sizing information and to identify and initiate replacement of meters that are incorrectly sized for their application to improve the overall operation of the utility metering system 5.

For example, meter sizing management module 11 maybe configured to include an interface to an order entry system. Meter sizing management module 11 may be configured to be a process step, providing meter sizing information, in the order entry system during normal order entry processes. Meter sizing management module 11 may be configured to implement the sizing correction function during normal meter replacement cycles and/or may be implemented to be interrupt driven.

For example, during normal meter replacement cycles, at the end of meter mechanical life, a customer such as utility company, will typically order the same size meter as a replacement. Some percentage of these meters are already incorrectly sized due to changes in occupancy, construction, subdividing a building into small units, etc. Upon receiving the customer order for replacement meters, existing metering data history is collected. This data may be used to evaluate the replacement meters and to identify discrepancies between the sizing listed and the replacement meter ordered as described below with reference to FIG. 3. An order entry system (not shown) may be configured such that meter sizing management module 11 may provide input automatically altering a replacement order to include meters of the correct sizes, and to identify those meters that required a change in size.

Alternatively, during periodic review of an AMI system, meter sizing management module 11 maybe configured to evaluate received meter data, trigger alerts on a "system dashboard" and generate work orders for meter to be replaced or inspected. Based on the measured consumption values and complementary data from similar users, management computer system 10 can initiate the order for the replacement meter of the correct size using the order entry system based on a received alert from meter sizing management module 11.

Meter sizing management module 11 may further be configured to evaluate received meter data, identify incorrectly sized meters, and implement a corrective function modifying the operation of utility metering system 5 having a master meter operating in conjunction with a plurality of submeters. A master meter/submeters system may be used, for example, in an apartment building where the master meter measures a utility delivered to the apartment building, while the plurality of submeters measure the utility delivered to each individual unit in the apartment building. The consumption reported by a master meter of an inappropriate size will not correspond with those consumption values reported by the sum of the submeters beyond the master meter. Cases where the submeters measure more water than the master meter and the master meter shows quantization effects indicate that the master meter is sized too large. To implement the corrective function, metering analytic software may be configured to use the quantization effects in the sizing heuristic identified herein along with master meter/submeter consumption numbers to initiate changes to correct the size of the master meter. The changes may be implemented either through lists, alerts, dashboard, the order entry system, and/or the work order generation system.

Referring now also to FIGS. 2A-D, graphs 200-206 are graphical representations of consumption data over time for six representative utility meter locations, according to an exemplary embodiment. The flow of water in a utility location is typically an analog signal generated by a measurement system.. For example, for one type of meter, the utility meter digitizes a measured flow at a rate of one volume unit per pole of a rotating magnet. A meter register translates the magnet rotations into units of measure (gallons, cubic feet, liters, etc.). The analog signal may then be quantized by the radio and meter data management system, which stores readings in hourly increments (or other programmed time units or measurement time periods).

In an exemplary embodiment, for a utility metering system 5, the majority of meter installations may report 10-40 unique values of hourly consumption in a six-month period, while a minority of installations may report fewer than 10 or more than 40 unique values. The graphs 200-206 depict utility consumption data for six different utility installations that exhibit questionable unique consumption patterns with fewer than 10 unique values. Graphs 200-206 depict atypical consumption patterns recorded at a utility management system 10.

Graph 200 depicts data indicating that an installed utility meter is too large for the location. Graph 200 shows increments in multiples of 75 gallons per hour, resulting in a plot having very poor resolution and indicating the utility management system 10 will be losing the granularity needed for utility monitoring algorithms to work properly. Consumption also indicates a wide range of consumption, supporting the theory that this user has low consumption usage "hidden" in the data. Plotting this user's daily consumption provides confirmation that there is a lack of granularity. The effects that identify the installed utility meter as being too large for the location are further discussed in detail below with reference to FIG. 4.

Graph 202 shows an irregular usage pattern that a utility may wish to investigate. Specifically, graph 202 shows one drastically different value of consumption 203 that is orders of magnitude larger than the rest. Graph 202 exhibits granularity in 7.5 gallon increments (1 $ft^3$). The one consumption value 203 is in the 165-gallon range, while the majority of the readings are in the 15 to 40-gallon range or in the sub 10-gallon range, which would be more typical for an installation.

Graphs 204 and 206 include data that indicates low total usage, and the data is indicative that the meter may be properly sized. The utility meters associated with these installations show only a few levels of reporting, but also have low maximum consumption rates. For example, displaying the maximum consumption of less than 60 gallons per hour, the installation depicted in graph 204 may simply be a small household that uses only small amounts of low flow rate water, and granular measurements may be irrelevant to the utility. However, if the consumption rates for these meters during the measurement time period is inconsistent with similar installations, these utility meters may also have sizing issues.

Figure 3:
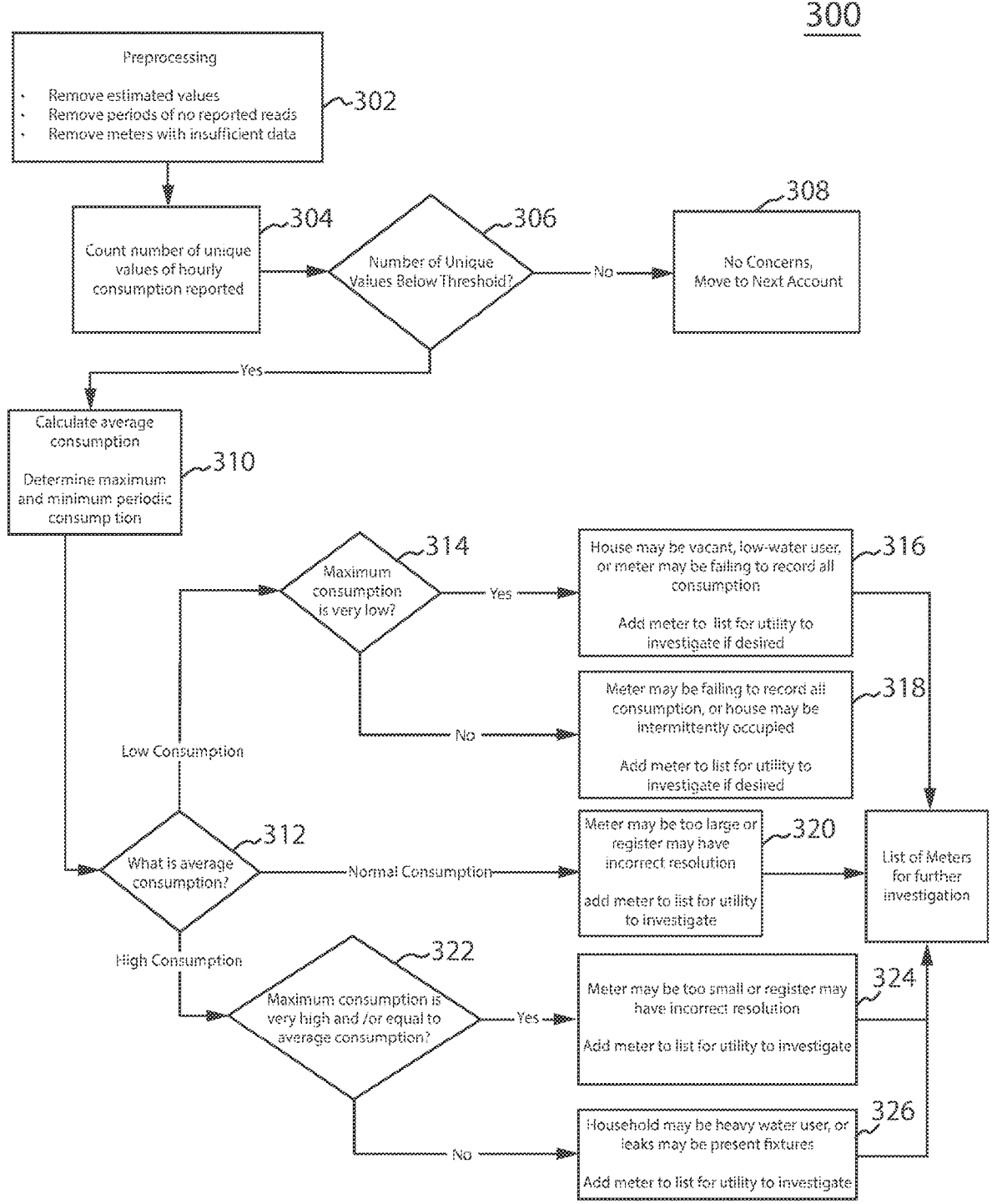
FIG. 3 is a flowchart depicting an exemplary method for identifying individual meters that have measurements indicating an incorrect size, resolution, or other unexpected consumption information, according to an exemplary embodiment.

Referring now to FIG. 3, a flowchart 300 depicts an exemplary method for identifying individual meters that have measurements indicating an incorrect size, resolution, or other unexpected consumption information, according to an exemplary embodiment. The list of meters generated using the steps of flowchart 300 may be used by a utility company to identify particular meter installations as having meters that may be incorrectly sized, and allocate resources accordingly.

In a preprocessing step 302, the utility meter data stored in database 19 may be processed to prepare the data for analysis. The data from database 19 may include historical meter reads with the highest frequency measurements available, data file format information (.CSV, column headers, timestamp format, etc.), known or believed information regarding meter size, registration, use classification (e.g., residential, commercial, etc.), and known or believed information regarding the data collection such as read interval, system outages, and any data manipulation performed either at the utility meter or at utility management system. Preprocessing step 302 can include the steps of removing estimated values, removing periods of no reported reads, and removing meters with insufficient data.

Following preprocessing, the processed data may be reviewed in a step 304 to count the number of unique values of hourly consumption reported. If it is determined in a step 306 that the number of unique values is not below a threshold, the utility meter may be flagged as not being of concern and data for the next utility meter may be reviewed in a step 308. If it is determined in step 306 that the number of unique values is below a threshold, the data for the utility meter may be processed to calculate an average consumption and determine the maximum and minimum periodic consumption in a step 310.

The average consumption may be reviewed in a step 312. If the average consumption is low consumption, a determination may be implemented to determine whether the maximum consumption is very low in a step 314. If the maximum consumption is very low, in a step 316, the utility meter associated with the data may be identified as being within a house that may be vacant, a low-water user, or having a meter that fails to record all consumption. Further, the meter serial number may be added to a list 330 with this identification and identified as being a candidate for further review. If the maximum consumption is determined to not be very low, in a step 318, the utility meter associated with the data may be flagged as failing to record all consumption, or being associated with the house that is intermittently occupied. Similar to step 316, the meter serial number may be added to the list 330 with this identification and flagged as being a candidate for further review.

If it is determined in step 312 that the average consumption is a normal consumption, in a step 320, the utility meter associated with the data may be identified as being too large or having a register that has an incorrect resolution and the meter serial number may be added to the list 330 with this identification and flagged as being a candidate for further review.

If it is determined in step 312, that the average consumption is high consumption, a determination may be made whether the maximum consumption is very high and/or equal to average consumption in a step 322. If the maximum consumption is very high and/or equal to average consumption, in a step 324, the utility meter associated with the data may be identified as being too small or having a register that has an incorrect resolution and the meter serial number may be added to the list 330 with this identification and flagged as being a candidate for further review. If the maximum consumption is not very high and/or equal to average consumption, in a step 326, the utility meter may be identified as being associated with a household that is a heavy water user or associate with the household that has a leak in their utility system and the meter serial number may be added to the list 330 with this identification and flagged as being a candidate for further review.

Advantageously, using the method depicted in flowchart 300, the number of samples needed to identify incorrectly sized meters accurately is relatively low. Only a low number of samples is needed based on the recognition that incorrectly sized meters may be determined by detection of unique quantization levels, combined with a review of maximum periodic consumption (hourly/daily/etc.) and average periodic consumption. Further, the data that may be used in this analysis is not dependent on high frequency sampling nor on utilizing data from a particular manufacturer's product.

None of the actual consumption records in database 19 may be identified as being associated with an "incorrectly sized meter" and performing a manual audit of the meters would be cost prohibitive. The validity of the method shown in flowchart 300 may be shown by modifying consumption records to eliminate any hourly consumption value that is below a low flow threshold of the meter. Next, the recorded values may be quantized into values equivalent to the minimum hourly flow rate for a particular meter. This procedure would duplicate the mechanical measurements that would occur at a different meter been installed.

Figure 4:
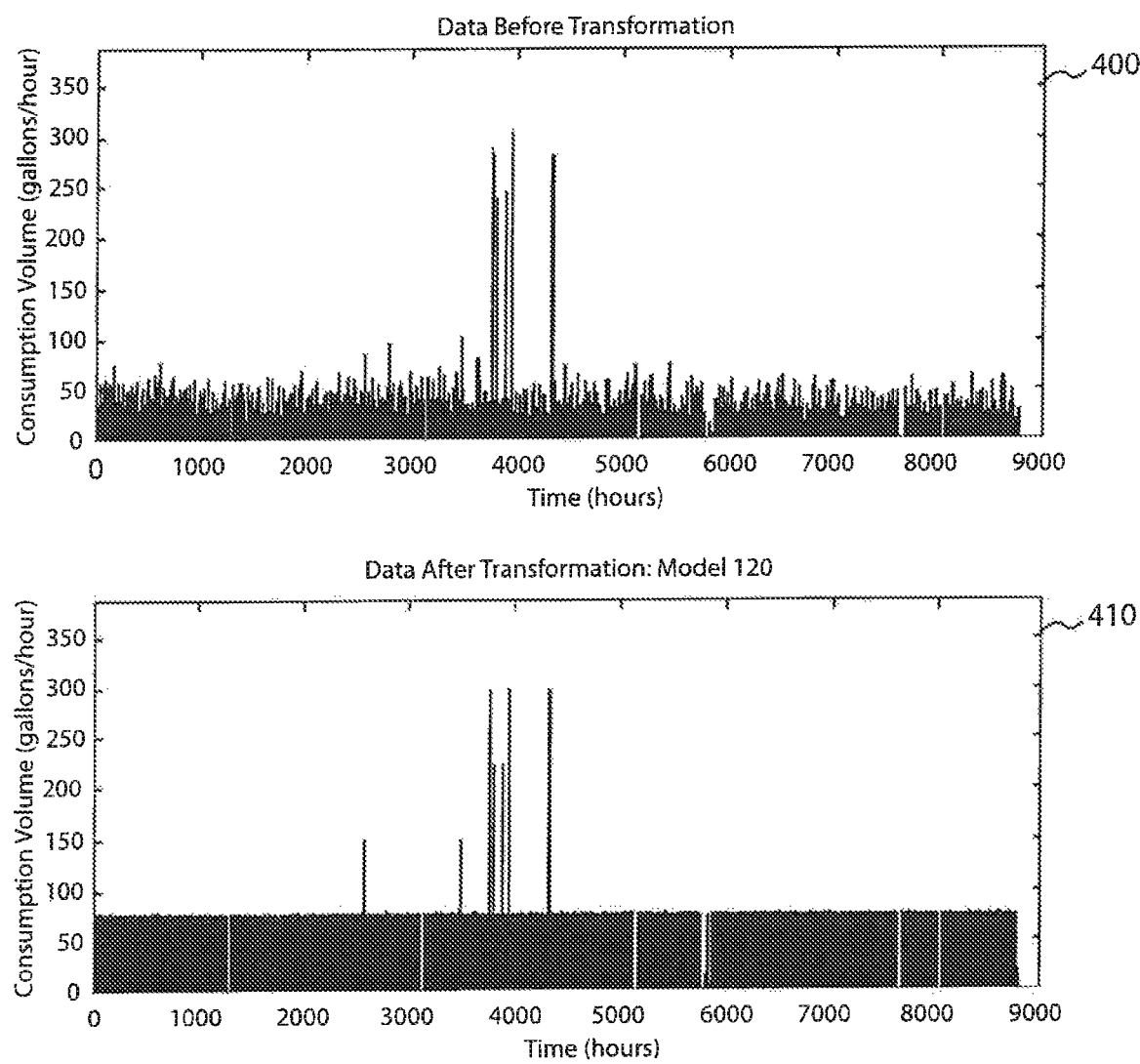
FIG. 4 are graphs depicts utility consumption data for a user having a residential ⅝ inch water supply line with the typical residential meter and a graph depicting surrogate utility consumption data for the same user created by mathematically adjusting the actual flow into a flow that represents an oversized water meter, according to an exemplary embodiment.

For example, referring now to FIG. 4, a graph 400 depicts utility consumption data for a user having a residential ⅝ inch water supply line with the typical residential meter. A meter register associated with the residential meter has a resolution of ⅒ of a gallon. The utility consumption data in graph 400 shows 669 unique values of readings in a 12 month data collection period. In contrast, graph 410 depicts surrogate utility consumption data for the same user created by mathematically adjusting the actual flow, as depicted in graph 400, into a flow that represents an oversized water meter. Based on this adjustment, graph 410 clearly shows the quantizing effects of the oversized meter being installed. Accordingly, the oversized meter is identified using the method of FIG. 3.

Quantizing includes restricting the utility meter data (a variable quantity) to discrete values rather than to a continuous set of values as shown and described below with reference to FIG. 4. Quantization may be used to identify incorrectly sized utility meters. A quantization effect occurs in the utility meter data when a utility meter accumulates flow information over a period of time longer than a measurement period for that meter without incrementing a flow unit. Accordingly, the utility meter data includes flow units based on a measured flow extending over several measurement time periods.

A meter that is too large will incorrectly measure very low flows, reducing revenue and total consumption numbers for that utility meter. A meter that has a register with too large of a resolution will measure correctly, but the reported information in the meter data management software will have a resolution is not useful for the advanced metering infrastructure (AMI) algorithms. A meter that is too small will run at full capacity often, accelerating the wear on the mechanical components and may wear out sooner than expected. The reported measurements in the meter data management software will indicate high-volume usage frequently, and very little low-volume usage (partial to the other values reported by this meter).

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A computer implemented method for selecting an appropriately sized meter for use in a selected application implemented by a computer processor implementing instructions stored in a non-transient memory, the instructions comprising
   receiving utility meter data transmitted from a plurality of utility meters, each utility meter being installed at a unique utility monitoring location;
   identifying incorrectly sized utility meters based on utility meter data for particular utility meters that displays quantization effects; and
   selecting an appropriate meter based on the identification of the utility meters displaying quantization effects.

2. The method of claim 1, wherein the quantization effect in the utility meter data is generated by a utility meter that accumulates flow information over a period of time longer than a measurement period for that meter without incrementing a flow unit.

3. The method of claim 2, wherein the utility meter data includes flow units based on a measured flow extending over a plurality of measurement time periods.

4. The method of claim 1, wherein the amount of utility meter data used for the identification is selected based on the utility meter usage.

5. The method of claim 1, further including determining a meter register type based on the identification of the incorrectly sized utility meters.

6. A meter replacement system for selecting an appropriately sized meter for use in a selected application, comprising
   a database including utility meter data transmitted from a plurality of utility meters, each utility meter being installed at a unique utility monitoring location;
   a meter sizing management system including a computer processor implementing instructions from a sizing application stored in non-transient memory for identifying incorrectly sized utility meters based on utility meter data for particular utility meters that display quantization effects; and
   a meter replacement system for ordering a replacement meter having a correct sizing based on the identification of the utility meters displaying quantization effects.

7. The system of claim 6, wherein the quantization effect in the utility meter data is generated by a utility meter that accumulates flow information over a period of time longer than a measurement period for that meter without incrementing a flow unit.

8. The system of claim 7, wherein the utility meter data includes flow units based on a measured flow extending over a plurality of measurement time periods.

9. The system of claim 6, wherein the amount of utility meter data used for the identification is selected based on the utility meter usage.

10. The system of claim 6, wherein the sizing application is further configured for identifying determining a meter register type based on the identification of the incorrectly sized utility meters.

11. A self-correcting advanced metering infrastructure including a plurality of utility meters, a meter communication system and a utility meter management system, comprising:
   a plurality of utility meters, each utility meter configured to measure and transmit utility consumption data at a unique utility monitoring location;
   a meter communication network for communication the utility consumption data from the plurality of utility meters to the utility meter management system;
   a meter sizing management system including a computer processor implementing instructions stored in non-transient memory for identifying incorrectly sized utility meters based on the transmitted utility consumption data for the plurality of utility meters that display quantization effects; and
   a meter replacement system for ordering a replacement meter having a correct sizing based on the identification of the utility meters displaying quantization effects to improve utility monitoring accuracy.

12. The system of claim 11, wherein the quantization effect in the utility consumption data is generated by a utility meter that accumulates flow information over a period of time longer than a measurement period for that meter without incrementing a flow unit.

13. The system of claim 12, wherein the utility consumption data includes flow units based on a measured flow extending over a plurality of measurement time periods.

14. The system of claim 11, wherein the amount of utility consumption data used for the identification is selected based on the utility meter usage.

15. The system of claim 11, wherein the meter sizing management system is further configured for identifying determining a meter register type based on the identification of the incorrectly sized utility meters.

16. The system of claim 11, wherein the meter sizing management system is configured for periodic evaluation of utility consumption data to identify quantization effects and the identification of quantization effects in a utility meter initiates replacement of the utility meter generating the utility consumption data including the quantization effects.

17. The system of claim 11, wherein the meter sizing management system is implemented based on a determined or detected end of meter mechanical life for a utility meter.

* * * * *